Figure 3:
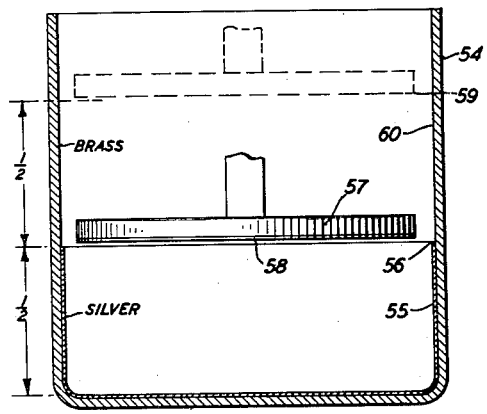

March 29, 1949. W. A. EDSON 2,465,639
CAVITY RESONATOR
Filed Jan. 31, 1945 2 Sheets-Sheet 1
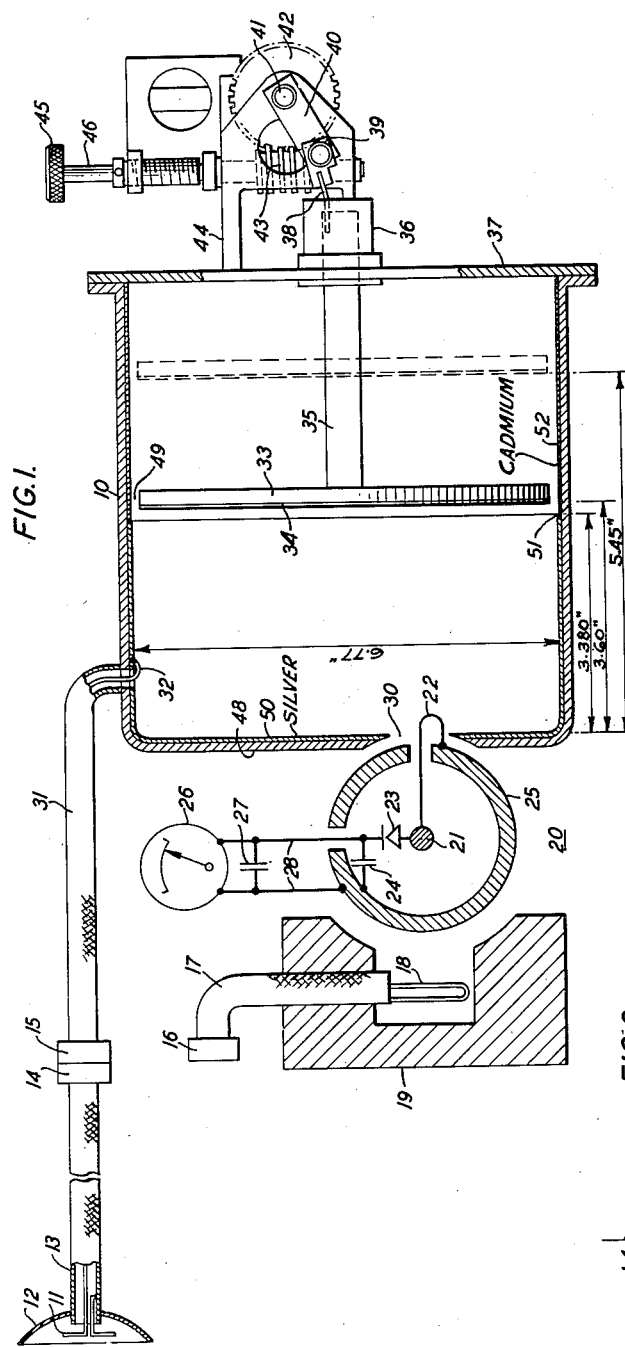
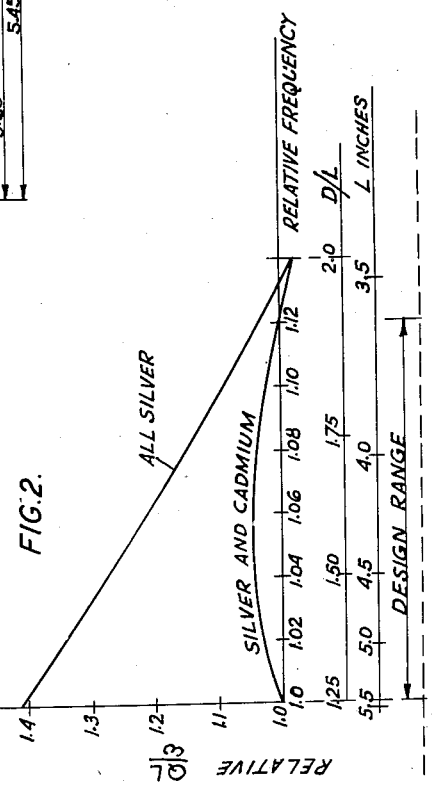
INVENTOR
W. A. EDSON
BY
E. V. Griggs
ATTORNEY March 29, 1949.  W. A. EDSON  2,465,639
CAVITY RESONATOR Filed Jan. 31, 1945  2 Sheets-Sheet 2

INVENTOR
W. A. EDSON
BY E. V. Griggs
ATTORNEY

Patented Mar. 29, 1949

2,465,639

UNITED STATES PATENT OFFICE 2,465,639

CAVITY RESONATOR

William A. Edson, New York, N. Y., assignor to Bell Telephone Laboratories, Incorporated, New York, N. Y., a corporation of New York Application January 31, 1945, Serial No. 575,515

4 Claims. (Cl. 178—44)

This invention relates to testing apparatus and more particularly to apparatus for use in ascertaining the effectiveness of object locating systems employing reflected electromagnetic waves. Such testing apparatus sometimes designated as a "ring box," "echo box," or "ringing cavity" uses a resonance chamber which builds up an internal electromagnetic field during receipt of a pulse of oscillations from the transmitter of the object locating system and upon cessation of the pulse returns oscillations of the same frequency to the receiver of the object locating apparatus for a period designated as the "ringtime" of the resonance chamber.

An object of the invention is to make more uniform with frequency variation the response characteristics of variable frequency space resonance electrical systems.

Another object of the invention is to provide a testing system of the ringing cavity type in which the ringtime is of substantially the same duration, other conditions being the same, for oscillations of any frequency within a predetermined limited frequency range.

An additional object of the invention is to provide an electrical resonance chamber which may be varied in its natural response frequency without greatly changing the time during which it will yield energy stored up in its internal electromagnetic field.

For use in connection with object locating systems it is desired to have the decrement or decay rate of a resonance chamber, commonly expressed in decibels per second, independent of frequency. In other applications of cavity resonators, a selectivity Q, which is independent of frequency, may be desirable. The present invention enables either of these results to be approximated. It also makes it possible to obtain other desired variations of Q or of decrement with reference to frequency.

If a cavity resonator testing apparatus is to be capable of operation in conjunction with all object locator systems operating within some assigned frequency band, it is necessary that the cavity resonator be provided with tuning means. This introduces the problem of securing a uniform response or, in other words, a constant ringtime for the cavity as its tuning is varied from one extreme or limiting frequency to the other.

It has long been the practice in dealing with resonant circuits and electrical systems to appraise them by means of a quality factor designated Q. For electrical resonance chambers operating at microwave frequencies and maintained without load on the cavity at a constant excitation the unloaded quality factor $Q_0$ is $$Q_0 = 2\pi \frac{\text{Energy stored}}{\text{Energy lost per cycle}} \quad (1)$$

If the excitation of the resonant chamber be applied by a pulse of oscillations of the resonance frequency and of a duration $t_1$, the degree of excitation of the chamber will of course depend upon the peak voltage E measured at the cavity or resonance chamber input and also upon the time $t_1$. The ringtime $t$ which is required for the field, after cessation of the exciting pulse, to die away to a prescribed minimum voltage $E_r$ also measured at the cavity input is, of course, dependent upon the initial energization of the field of the cavity and upon $Q_L$ the quality factor of the cavity as loaded by the resistance of the antenna or coupler. By calculations which it is not necessary to pursue the ringtime of a resonant chamber may be shown to be $$t = 2\frac{Q_L}{\omega} \log e\left(\frac{E}{E_r}\left(\frac{Q_0 - Q_L}{Q_0}\right)\left[1 - e^{-\frac{\omega t_1}{2Q_L}}\right]\right) \quad (2)$$

Both theory and practice indicate that when the resonance chamber is tuned first to one incoming frequency and then to another incoming frequency the ringtime of the resonance chamber changes even though the duration, pulse shape and strengths of the two different frequency incoming pulses be substantially identical and the sensitivity of the response by which the ringtime is measured likewise be substantially the same. This is primarily because of changes which occur in the factor $$\frac{Q_L}{\omega}$$

of Equation 2. This change in the magnitude of the ringtime is of such nature that beginning at the outermost position of the tuning piston which renders the interior volume of the resonance chamber a maximum and the resonance frequency low $$\frac{Q_L}{\omega}$$

will have its greatest magnitude. As the tuning piston moves inwardly to decrease the volume and to increase the natural resonance frequency of the resonance chamber the magnitude of $$\frac{Q_L}{\omega}$$

decreases rather rapidly. The rapid change of $$\frac{Q_L}{\omega}$$

may not be too troublesome in the case of apparatus in which the tuning range is relatively narrow but it becomes very important where large percentage frequency variations occur as in the case of test apparatus which must work with various types of transmitters operating at frequencies which may differ rather widely. For such wide range tuning apparatus it is highly desirable that the ringtime of the resonance chamber remain reasonably constant over the relatively wide tuning range.

The explanation of the change in magnitude of $$\frac{Q_L}{\omega}$$

with the change in tuning is to be found in the fact that $Q_L$ is a function, among other things, of the ratio of the diameter D to the length L of the resonance cavity. It is also a function of the skin depth, which varies as the frequency is varied by changing the ratio D/L. It happens that these two effects are compounded so that $Q_L$ decreases as $\omega$ increases, with the result that the ratio $$\frac{Q_L}{\omega}$$

changes relatively rapidly.

It transpires that $Q_L$ is also a function of the resistivity of the interior surface of the resonance chamber and becomes smaller with higher resistivity. Consequently, if it be possible to increase the resistivity of the interior surface as the volume of the cavity resonator is increased, a compensation for the increase in magnitude of the ringtime $t$ with decrease in frequency is possible. According to this invention this result is attained by making that portion of the side walls of the resonance chamber remote from the tuner piston of high conductivity and by reducing the conductivity of that portion of the side walls of the resonance chamber in the neighborhood of the tuner. In a resonance chamber having the resistivity of its side walls so designed the effective resistivity is low at minimum volume and increases with increasing volume when the higher resistance portions of the walls are exposed.

In order to effect a theoretically complete compensation for the change in ringtime with change in tuning, it would be necessary to graduate the resistivity of the interior wall surfaces in a complicated manner, which might be calculated from Equation 2. In practice, however, this is unnecessary since a reasonably satisfactory result may be had and a substantially constant ringtime obtained by arbitrarily coating the interior side walls of the resonance chamber throughout a portion of their length with material having a given electricity conductivity and throughout all or portions of the remainder with material having a different electrical conductivity.

In the drawing Fig. 1 shows a diagram, with certain structural features in partial section, of testing apparatus embodying one form of the invention;

Fig. 2 is a graph indicating the improvement in constancy of ringtime which is attained; and Figs. 3, 4, 5 and 6 illustrate respectively different modifications of the cavity resonator of Fig. 1.

Referring to Fig. 1 there is illustrated in section a cavity resonator 10 provided with the necessary input and output coupling systems, a detecting and indicating device and a variable tuner. For picking up microwave energy a dipole pick-up device 11 which may or may not be provided with a reflecting collector 12 is shown connected to a coaxial cord 13 terminating in a coaxial plug 14 associated with a jack 15. When the apparatus is to be used as a non-selective system for determining the presence or absence of microwave oscillations the plug 14 is removed from the position shown and is plugged into jack 16 of the untuned input circuit comprising coaxial conductor 17 and coupling loop 18. The coupling loop is enclosed in a shielding casing 19 which serves also to enclose the rotary coupler and attenuator 20. Although for purposes of illustration the casing 19 is diagrammatically shown in a position considerably separated from the resonator 10 it is to be understood that in actual construction the casing 19 is fitted closely to and supported by the closed end of the cylindrical resonator 10. The details of this structure are disclosed and claimed in the W. A. Edson Patent 2,414,456, granted January 21, 1947, for Electrical testing system. The rotary coupling switch and attenuator 20 is mounted for rotation by means of a shaft aligned with the axis of the coaxial Lecher line central conductor 21. It includes a coupling loop 22 electrically connected to a microwave detector 23 preferably of a type employing a high purity silicon crystal plate with a fine point contact having a capacity of the order of 10 micro-microfarads, the quarter wavelength coaxial Lecher circuit 21 and the outer conductor 25. The detector 23 is connected to the quarter wavelength line at its open end and as close as possible to the loop 22. The remote end of the quarter wavelength line is short-circuited. The circuit for the unidirectional rectified current extends from the terminals of the detector by way of flexible leads 28 to the terminals of the milliammeter 26 and the short-circuiting capacitor 27. The capicitor 27 may have a capacitance of the order of 1 microfarad and it serves to average or smooth out the unidirectional current to enable the milliammeter 26 to give a steady deflection during receipt of rectified pulse energy. In the actual structure it is preferred, as in the disclosure of the W. A. Edson Patent 2,414,456, to which reference has been made, to incorporate the coaxial Lecher circuit 21, 25 and the detector 23 as integral parts of the rotating structure which may accordingly be self-shielding and electrically invariable with respect to its connections to the coupler 22.

When in use to observe and indicate the presence of microwave oscillations the coupler 22 is rotated by means of its shaft from the position shown in which it projects through aperture 30 into the internal field of the resonator 10 to a position in which it is adjacent the coupling loop 18. In the untuned input circuit position with the plug 14 associated with jack 16 microwave energy of any frequency which the dipole 11 will pick up is transmitted over the coaxial circuit by way of couplers 18 and 22 to the circuit of detector 23 and the unidirectional or rectified electromotive force resulting is applied over the flexible cords 28 to the milliammeter 26.

When it is desired to use the apparatus to ascertain the frequency or frequency distribution of microwaves the presence of which has been ascertained, the apparatus may be returned to the tuned input circuit condition shown in Fig. 1 with plug 14 associated with jack 15 and with the rotary coupling device and attenuator in the position shown in which loop 22 projects through aperture 30. Under these circumstances incoming microwave energy impressed upon dipole 11 is transmitted over the coaxial cord 13, plug and jack 14 and 15 respectively, and the line 31 to coupling loop 32 which projects through an aperture in the side of the cavity resonator 10 to couple with the internal electromagnetic field of the resonator. The cavity resonator 10, as is well known, constitutes a highly selective device which responds strongly to oscillations of a particular frequency or frequencies while discriminating highly against those for which it does not have a natural resonance. Accordingly there will be supplied to coupling loop 22 microwave energy of the selected frequency to which the cavity resonator 10 is responsive. That selected energy will be detected and indicated in the manner explained in connection with the operation of the untuned input circuit.

For tuning the resonator 10 to any preassigned frequency or for varying the tuning through a range of frequencies in order to measure the frequency of incoming oscillations a reciprocating piston 33 is provided. This may consist of a flat circular disc of brass or aluminum or even of dielectric material provided with an interior surface coating 34 of high conductivity metal such as silver or copper. The position of piston 33 is determined by a plunger or piston rod 35 which fits closely through the circular aperture of the toroidal guide 36 mounted on the cover 37 of the resonator 10. At its outer end the piston rod 35 is connected by a flat spring 38, a coupling rod 39 and a crank 40 to a rotating shaft 41 to which is fixed the worm wheel 42 of a worm gear 43. This mechanism is supported on a framework 44 mounted upon the cover plate 37. The worm gear 43 is manually controlled through the tuning knob 45 and shaft 46. Through this mechanism it is possible to move the piston from its innermost position at which it is shown in solid lines to its most outermost position indicated in dotted lines.

The cavity resonator structure 10, as has been suggested, is of circular cylindrical form closed at one end and provided with the cover 37 at the otherwise open end. The resonator 10 may consist of metallic or plastic composition having its inner surface coated with material having high electrical conductivity. In order to achieve stiffness and rigidity of structure with low mass aluminum was used in the particular design illustrated.

The portion of the resonator effective for selectivity at any particular time is that confined between the closed end 48 of the resonator and the coated surface 34 of the piston. The piston fits loosely within the cylindrical structure leaving an annular gap 49 at its periphery to aid in discrimination against unwanted modes of oscillation involving radially directed electric vectors. This annular peripheral gap has very little effect upon oscillations of the desired $TE_{01n}$ mode. The aperture 39 is grossly exaggerated in the drawing. In actual practice it comprises a narrow slot extending tangentially with respect to a circle coaxial with the end 48 of the resonator, the circle having a radius of about four-tenths that of the resonator. The slot is made of just sufficient width to enable adequate mechanical clearance of the loop 22 in its motion into and out of the resonator.

It has already been explained that as the tuner piston 33 is moved from its innermost position to its outermost position to increase the effective volume of the resonator, the selectivity factor Q of the resonator increases and its decrement decreases assuming that the interior surfaces of the resonator are of uniform resistivity material. In order to compensate for this effect and to hold the ratio $$\frac{Q_L}{\omega}$$

relatively constant with change of tuning the interior surface of the cavity resonator may be coated or plated with a high conductivity coating 50 up to the point 51 which is a small distance inside the innermost position of the piston 33. The coating 50 may, for example, consist of silver or gold. In the design shown it consisted of silver. The thickness of the plating should be several times the skin depth as of the order of 0.0005 inch. Commercial plating is usually sufficiently thick. The thickness of this plating is so small compared to the diameter of the cavity resonator itself as to have relatively little effect upon the tuning of the resonator. Under these circumstances the coating 34 on the inner surface of the tuning piston may consist of the same material, namely, silver. If the entire inner surface of the resonator 10 were plated with silver, movement of the piston 34 outwardly to increase the enclosed volume would cause increase of the factor Q and of the ringtime of the resonator or decrease of the decrement. In order to prevent this effect that portion of the inner surface of the walls of the cavity resonator from the point 51 toward the cover 37 is plated as at 52 with a different electrically conducting substance of higher resistivity than the coating 50. In the particular device illustrated in Fig. 1 the coating 52 is of cadmium. Cadmium was chosen in this instance because it is readily plated and it has a suitable resistivity some four times that of silver. Consequently as the piston 34 is moved outwardly through its tuning range the effective resistivity of its interior surface increases with exposure of the cadmium-coated surface.

In an actual structure designed for operation at wavelengths of 11 to 12.5 centimeters, the internal diameter of the resonator was 6.77 inches, the silver coating extended 3.38 inches from the end of the resonator to the point 51, the distance to the face of the piston at its innermost position was 3.60 inches and at its outermost position 5.45 inches. This enabled the device to be tuned through a range of frequencies from 2720 to 2390 mc. corresponding to wavelengths extending approximately from 11.0 centimeters to 12.5 centimeters.

The performance of the cavity resonator device of Fig. 1 is illustrated in the graphs of Fig. 2 in which the factor $$\frac{Q_L}{\omega}$$

is plotted with reference to the effective length L of the resonator and the relative frequency for oscillations of $TE_{011}$ mode. It will be apparent that as the frequency extends throughout a range from 1 to 1.12 or approximately 12 per cent change that with an all-silver coating relative $$\frac{Q_L}{\omega}$$

varies from 1.4 to unity or, in other words, over a range of about 40 per cent. With the silver and cadmium coating shown in Fig. 1 the range of variation at maximum amounts to only about one-eighth of the maximum for the all-silver coating. It will therefore be apparent that a very marked improvement is obtained and that the actual magnitudes of $$\frac{Q_L}{\omega}$$

at the extreme tuning positions differ very little.

Fig. 3 shows a modification of the device of Fig. 1 which provides a less expensive structure.

In this modification the resonance chamber 54 comprises a brass cylinder having an interior plating 55 of silver extending over the lower end of the cylinder and up the side walls to a point 56 just short of that reached by the inner face of piston 57 which is likewise silver-plated as at 58. When the piston is withdrawn to its uppermost position at 59 the upper unplated portion 60 exhibits the resistivity of brass which is of the order of four times that of silver. This expedient is not particularly satisfactory in the case of resonance chambers constructed of aluminum for the reason that the conductivity of aluminum is not sufficiently different from that of silver.

Figure 4:
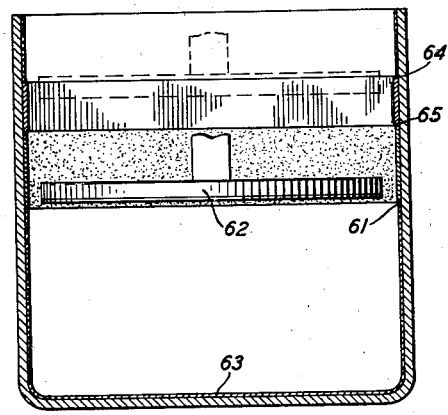

Fig. 4 discloses a modification in which, to approach more nearly theoretically correct graduated plating, two zones of higher resistivity are employed. The lower end of the cylinder and the side walls up to point 61, which is approximately the lower limit of travel of tuner piston 62, are plated as at 63 with silver as is also the inner face of the piston 62. The zone over which the piston travels extending approximately from the point 61 to the point 64 is divided into two regions. The intermediate region from 61 to 65 is plated with a material having a resistivity different from and higher than that of silver. The upper portion from point 65 to 64 is plated with a still different material having a still higher resistivity. This structure permits either a wider range of tuning for a given percentage deviation of ringtime or a more constant ringtime for a given range of tuning.

Figure 5:
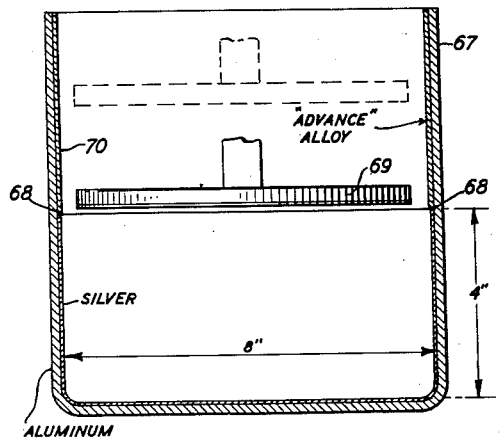

Fig. 5 illustrates the advantage which the invention affords in another specific design utilizing $TE_{012}$ mode, covering a frequency band 30% wide. The cylinder 67 as in the usual case may consist of aluminum. For one given design the diameter of the cylinder may be eight inches and the silver plating may extend over the interior lower end and also for a distance of four inches up to the point 68 which marks the approximate lower limit of travel of the tuner piston 69. The zone 70 extends above the point 68 at least as far as the maximum travel of the tuner piston 69. It may be plated with an alloy consisting of 60% copper and 40% nickel. This alloy has a resistivity of about twenty-five times that of silver. If the structure of Fig. 5 with the dimensions as given were to have its interior surface entirely silver-plated it would exhibit a deviation in ringtime throughout its range of tuning of ±35 per cent. However, with the same structure silver-plated as before and with the superposed plating of the high resistivity alloy material, the structure exhibits a maximum deviation of ringtime throughout its range of tuning of ±9 per cent.

Figure 6:
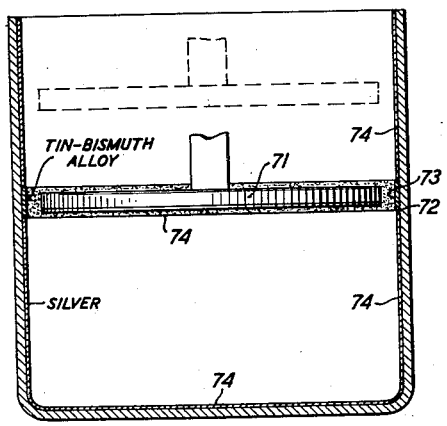

Fig. 6 illustrates an additional improvement which may be attained by a somewhat narrower band of higher resistivity plating. In this structure the internal dimensions of the cylinder and the travel of the tuner piston are the same as in the cases of Figs. 4 and 5. The interior of the cylinder including its lower end surface and the interior surface of the tuner piston 71 are silver-plated as at 74. At the point 72 four inches above the lower surface of the cylinder and the approximate lower limit of travel of the piston 71 begins a one-half inch wide band 73 throughout which the walls of the cylinder are plated with an alloy having a resistivity about 140 times that of silver. For this purpose a tin-bismuth alloy comprising 2 per cent tin and 98 per cent bismuth is suitable. This structure exhibits a maximum deviation in ringtime throughout its range of tuning of ±5 per cent.

It will be apparent that any desired degree of compensation may be attained by providing a sufficient number of zones of material of different resistivity. It will also be apparent that the resistivity of the surface adjacent those regions in which there is a weak electromagnetic field for the desired mode of oscillations will have relatively less effect but that the resistivity of the surface adjacent the zones of strong electromagnetic field for oscillations of the desired mode will have a strong effect in determining the ringtime.

It will also be evident that this invention provides a resonant system which may be varied or tuned in a continuous manner over a relatively high percentage range of tuning while at the same time automatically varying the damping factor of the resonant system in such manner as to cause the system to respond for a substantially constant period to an excitation of a given intensity.

It will also be evident that other forms of variation of the damping factor with respect to frequency may be achieved, as for example, constant Q with respect to frequency.

What is claimed is:

1. A space resonance chamber having a movable wall to vary its resonant frequency, the interior surface of the fixed wall being divided into zones of different resistivity in such a way as to produce a desired variation of the decrement with change in frequency.

2. A cylindrical space resonance chamber having a tuning piston adjacent one end, the interior surface of the cylindrical wall being cadmium-plated toward the end adjacent the piston and silver-plated toward the opposite end.

3. A space resonance chamber having one wall mounted in the manner of a piston and fitting loosely within the surrounding walls, the surface of the surrounding walls being divided into zones of different resistivity whereby the ringing time of the chamber tends to be equalized for different positions of the piston wall.

4. An electrical resonance chamber comprising a cylinder having one end provided with a piston tuner capable of movement between two positions along the cylindrical wall, the surface of the wall between the positions being cadmium-plated and at least a portion of the remainder of the wall being silver-plated.

WILLIAM A. EDSON.

REFERENCES CITED

The following references are of record in the file of this patent:

UNITED STATES PATENTS

| Number | Name | Date |
|---|---|---|
| 1,802,767 | Kummerer | Apr. 28, 1931 |
| 2,106,769 | Southworth | Feb. 1, 1938 |
| 2,235,521 | Higgins | Mar. 18, 1941 |
| 2,242,404 | Schussler | May 20, 1941 |
| 2,405,277 | Thompson | Aug. 6, 1946 |
| 2,423,506 | Landon | July 8, 1947 |